Figure 1:
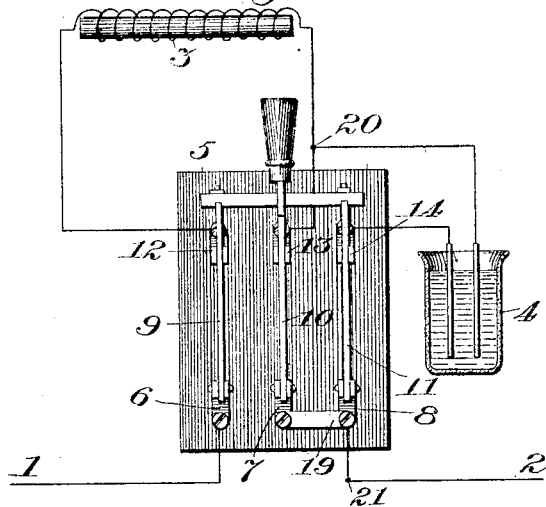

No. 808,364. PATENTED DEC. 26, 1905.
W. S. HORRY.
ELECTRIC SWITCH.
APPLICATION FILED MAR. 20, 1905.

Witnesses:
Geo. E. Garrett
J. B. Hill.

Inventor:
William Smith Horry,
by Lynus Townsend,
Att'ys.

UNITED STATES PATENT OFFICE.

WILLIAM SMITH HORRY, OF NIAGARA FALLS, NEW YORK.

ELECTRIC SWITCH.

No. 808,364.        Specification of Letters Patent.        Patented Dec. 26, 1905.

Application filed March 20, 1905. Serial No. 251,049.

*To all whom it may concern:*

Be it known that I, WILLIAM SMITH HORRY, a citizen of the United States, residing at Niagara Falls, in the county of Niagara and State of New York, have invented certain new and useful Improvements in Electric Switches, of which the following is a specification.

When an electric circuit containing an inductance is interrupted, the inductance generates an electromotive force in the same direction as the applied electromotive force. When the inductance and applied electromotive force are high, the secondary electromotive force, due to a sudden rupture of the circuit, may be so great as to form an arc at the break or endanger the insulation of the circuit.

In my application, Serial No. 242,799, filed January 26, 1905, I have described and claimed an arrangement for protecting circuits of high inductance and suppressing the arc in which the circuit-breaker is provided with a shunt-circuit containing an electrolytic cell which has an anode for the inductive discharge consisting of a material which offers an abnormally high resistance to the flow of current therefrom, preferably aluminium or an aluminium alloy. The circuit-breaker is arranged to simultaneously open the main circuit and close the shunt-circuit, or vice versa, and the cell is designed to substantially prevent the passage of current under the presence of the line electromotive force alone, but to yield when the electromotive force generated in the inductance by the rupture of the main circuit is added thereto, thereby preventing an arc at the main break. The cell thus acts as an automatic safety-valve, resuming its original insulated condition when the voltage falls to its normal value. If the circuit to be thus protected carries a large current, an electrolytic cell of some size is required to prevent arcing at the break. The switch shown in Figs. 1, 2 of my earlier application is constructed to successively close the shunt and main circuits. The electrolytic cell is thereby charged, acting as a condenser of some capacity, and then discharges at the switch-terminals with a snapping spark when the main circuit is closed, and the cell is thereby short-circuited.

The present invention is a switch which is constructed to successively open the main and protective shunt-circuits, but directly close the main circuit, thereby preventing any sparking or arcing due to either inductance or capacity. In its preferred form this switch comprises three movable blades, two of which control gaps in the main circuit, while the third controls a gap in the shunt-circuit. One of the main-circuit blades and the shunt-circuit blade are arranged to move in unison, while the second main-circuit blade is arranged to both open and close its gap before either of the other blades is operated.

Figure 2:
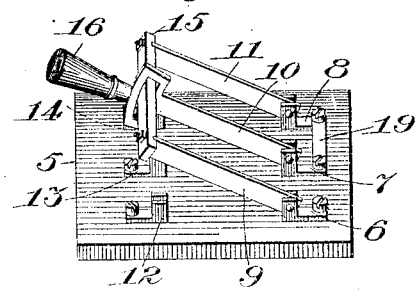
Figure 3:

Referring to the accompanying drawings, Figure 1 is a diagrammatic view of the main circuit containing the inductance, the shunt-circuit containing the electrolytic cell, and the switch. Fig. 2 is a perspective view of the switch in its open position; and Fig. 3 is a side elevation of the intermediate switch-blade, showing the operating-bar of the other two blades in section.

In Fig. 1 the line-wires are indicated by the numerals 12, and the inductance and electrolytic cell by the numerals 3 4. The switch 5 consists of a base having three line-terminals 6 7 8, in which are severally pivoted the switch-blades 9 10 11, which in turn are received by the terminals 12 13 14. The outer switch-blades 9 11 are connected by a bar 15 of insulating material. The intermediate blade 10 has an operating-handle 16 and a wide portion 17, in which is an arc-shaped slot 18, receiving the bar 15. The terminals 7 8 are permanently connected by a metal strip 19. The shunt-circuit containing the cell 4 includes the switch-blade 11 and its terminals 8 14 and is connected to the main circuit at the points 20 21.

When it is desired to open the circuit, the switch-handle 16 is pulled outward and the blade 10 leaves the terminal 13, thereby opening one gap of the main circuit, but leaving the electrolytic cell in circuit to relieve the abnormal voltage due to the inductance 3, which would otherwise spring an arc between the blade 10 and its terminal 13. As the blade 10 continues to rise, however, the bottom of the slot 18 engages and lifts the bar 15, thereby moving the blades 9 11 out of contact with their terminals 12 14, thus simultaneously opening the gaps in the main circuit and the shunt-circuit. To reëstablish the main circuit, the switch-handle 16 is forced inward, first closing the blade 10 into its terminal 13, and finally forcing the blades 9 11 into their terminals 12 14. The main and shunt circuits are thereby closed simultaneously and arcing between the shunt-circuit blade 11 and its terminal 14 is prevented. The switch thereby enables the main and protective shunt-circuits to be controlled without the production of an arc at either make or break.

I claim—

1. In combination, a main circuit containing an inductance, a shunt-circuit containing an electrolytic cell, the anode of said cell consisting of a material which offers an abnormally high resistance to the flow of current therefrom, and a switch to successively open said main and shunt circuits but directly close said main circuit, as set forth.

2. In combination, a main circuit containing an inductance, a shunt-circuit containing an electrolytic cell, the anode of said cell consisting of a material which offers an abnormally high resistance to the flow of current therefrom, and a switch to successively open but simultaneously close said main and shunt circuits, as set forth.

3. A switch, comprising three movable contact members, means for moving two of said members simultaneously, and means for moving the third contact member in advance of the other two members, as set forth.

4. A switch, comprising three movable blades, two of said blades being rigidly connected and the third blade being movable in advance of said connected blades, and means whereby the movement of the independent blade effects the movement of said connected blades, as set forth.

5. A switch, comprising two outer movable blades, a bar of insulating material rigidly connecting said blades, and an intermediate movable blade having a wide slot receiving said bar, as set forth.

In testimony whereof I affix my signature in presence of two witnesses.

WILLIAM SMITH HORRY.

Witnesses:
F. B. O'Connor,
E. H. Schmeck.